United States Patent
Engel

(10) Patent No.: US 9,383,181 B2
(45) Date of Patent: Jul. 5, 2016

(54) METHOD FOR COUPLING TWO SYSTEM COMPONENTS OF A MEASURING DEVICE, IN PARTICULAR A COORDINATE MEASURING DEVICE

(71) Applicant: Carl Zeiss Industrielle Messtechnik GmbH, Oberkochen (DE)

(72) Inventor: Thomas Engel, Aalen (DE)

(73) Assignee: CARL ZEISS INDUSTRIELLE MESSTECHNIK GMBH, Oberkochen (DE)

( * ) Notice: Subject to any disclaimer, the term of this patent is extended or adjusted under 35 U.S.C. 154(b) by 115 days.

(21) Appl. No.: 14/293,053

(22) Filed: Jun. 2, 2014

(65) Prior Publication Data

US 2014/0259715 A1 Sep. 18, 2014

Related U.S. Application Data

(63) Continuation of application No. PCT/EP2011/073700, filed on Dec. 21, 2011.

(51) Int. Cl.
*G01B 7/008* (2006.01)
*G01B 11/03* (2006.01)
(Continued)

(52) U.S. Cl.
CPC ............... *G01B 5/008* (2013.01); *G01B 7/008* (2013.01); *G01B 11/005* (2013.01); *G01B 11/007* (2013.01)

(58) Field of Classification Search
CPC ........ G01B 5/008; G01B 5/012; G01B 7/008; G01B 7/012; G01B 11/005; G01B 11/007
USPC .......................................................... 33/503
See application file for complete search history.

(56) References Cited

U.S. PATENT DOCUMENTS 4,271,508 A * 6/1981 Schenk ................. H04J 3/0605
370/297
4,561,776 A 12/1985 Pryor
(Continued)

FOREIGN PATENT DOCUMENTS

DE 200 08 721 U1 9/2000
DE 10 2004 014 153 A1 10/2005
(Continued)

OTHER PUBLICATIONS

International Search Report, dated Mar. 30, 2012; 10 pp.
(Continued)

*Primary Examiner* — Christopher Fulton
(74) *Attorney, Agent, or Firm* — Harness, Dickey & Pierce, P.L.C.

(57) ABSTRACT

A method for coupling a first system component and a second system component of a coordinate measuring device for determining by means of at least one sensor the three-dimensional coordinates of an object to be measured. An interface arrangement is provided between the first system component and the second system component. The interface arrangement comprises an electrical interface, formed from at least two electrical transmission paths, for transmitting a first electrical voltage between the first system component and the second system component, and at least one optical interface formed from light waveguides. The at least one sensor is supplied with the first electrical voltage via the two electrical transmission paths of the electrical interface. An analog measurement signal from the sensor is converted into a digital measurement signal. The digital measurement signal is transmitted by means of the light waveguides of the optical interface.

20 Claims, 9 Drawing Sheets

(51) Int. Cl.
 *G01B 5/008* (2006.01)
 *G01B 11/00* (2006.01)

(56) References Cited

U.S. PATENT DOCUMENTS

| | | | |
|---|---|---|---|
| 4,963,728 A | 10/1990 | Hof et al. | |
| 5,210,399 A * | 5/1993 | Maag | G01B 11/007 250/202 |
| 8,125,649 B2 | 2/2012 | Godbillon et al. | |
| 8,627,576 B2 * | 1/2014 | Engel | G01B 21/047 33/503 |
| 8,823,930 B2 * | 9/2014 | Engel | G01N 21/88 356/237.1 |
| 8,950,078 B2 * | 2/2015 | Engel | G01B 11/005 33/502 |
| 8,997,362 B2 * | 4/2015 | Briggs | G01B 11/005 33/503 |
| 2011/0229091 A1 | 9/2011 | Jensen et al. | |
| 2015/0219452 A1 * | 8/2015 | Bridges | G01B 21/042 33/503 |

FOREIGN PATENT DOCUMENTS

| | | | | |
|---|---|---|---|---|
| DE | 10 2007 054 915 A1 | 5/2009 | | |
| DE | WO 2013091698 A1 * | 6/2013 | | G01B 11/007 |
| EP | 0 362 625 A2 | 4/1990 | | |
| EP | 2 019 282 A1 | 1/2009 | | |
| EP | 2 194 357 A1 | 6/2010 | | |
| WO | 2008/098716 A2 | 8/2008 | | |

OTHER PUBLICATIONS

English language translation of International Preliminary Report on Patentability (Chapter 1); issued by WIPO Jul. 3, 2014; 12 pp.

* cited by examiner

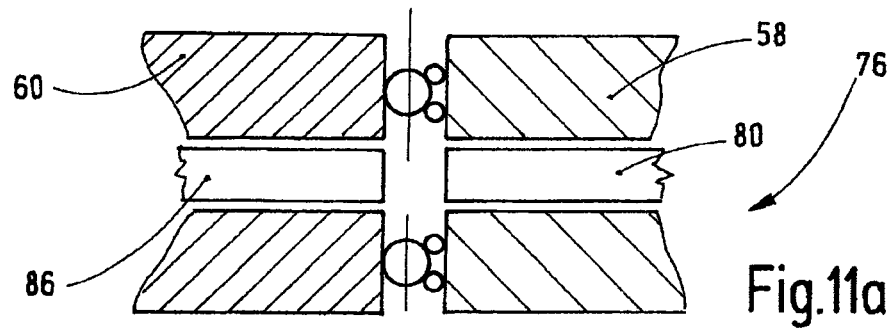
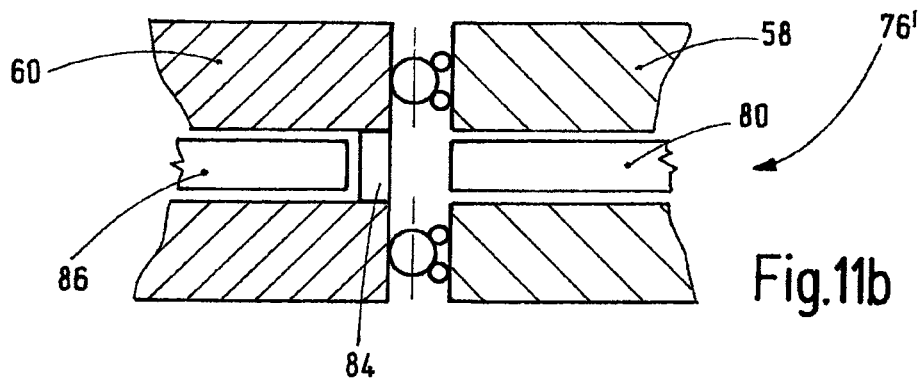
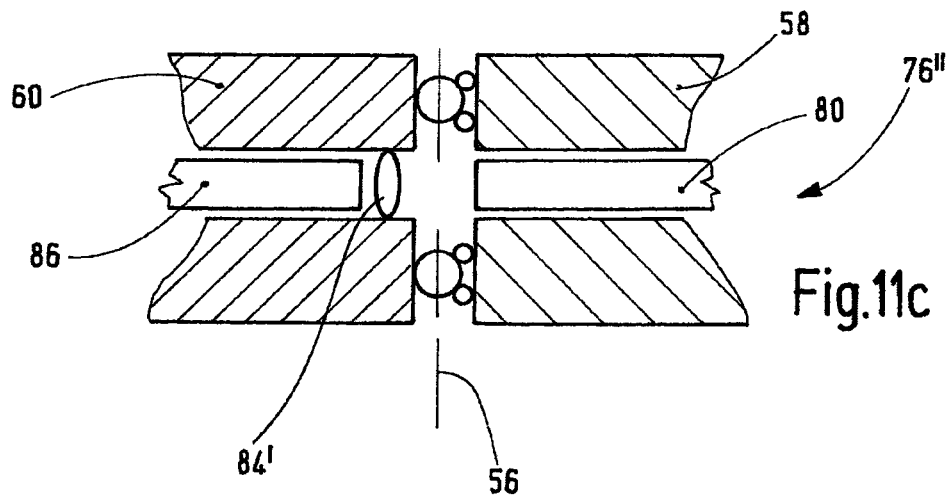

METHOD FOR COUPLING TWO SYSTEM COMPONENTS OF A MEASURING DEVICE, IN PARTICULAR A COORDINATE MEASURING DEVICE

CROSS-REFERENCE TO RELATED APPLICATIONS

This is a Continuation application of International patent application PCT/EP2011/073700, filed Dec. 21, 2011. The entire contents of this prior application is incorporated herein by reference.

BACKGROUND OF THE INVENTION

The present invention relates to a method for coupling a first system component and a second system component of a measuring device, in particular a coordinate measuring device, for determining by means of a sensor a property, in particular three-dimensional coordinates and/or other specific local properties, for example roughness, color or scattering behavior, of an object to be measured, wherein an interface arrangement is provided between the first system component and the second system component, wherein the interface arrangement is provided with at least one electrical interface, formed from at least two electrical transmission paths, for transmitting a first electrical voltage between the first system component and the second system component, and with at least one optical interface formed from light waveguides.

According to another aspect, the present invention relates to a measuring device, in particular a coordinate measuring device, for determining by means of a sensor a property, in particular three-dimensional coordinates and/or other specific local properties, for example roughness, color or scattering behavior, of an object to be measured, having a first system component and a second system component, wherein an interface arrangement is formed between the first system component and the second system component, wherein the interface arrangement comprises at least one electrical interface, formed from at least two electrical transmission paths, for transmitting electrical energy between the first system component and the second system component, and at least one optical interface formed from light waveguides.

Methods for coupling system components of measuring devices and coordinate measuring devices are known, for example, from document EP 2 194 357 A1.

Coordinate measuring devices are widely known in the prior art. They are used, for example, in order to inspect workpieces in the scope of quality assurance, or in order to determine the geometry of a workpiece fully in the scope of so-called reverse engineering. Furthermore, many other possible applications may be envisioned.

In such coordinate measuring devices, various types of sensors may be used in order to acquire the coordinates of a workpiece to be measured. To this end, for example, tactilely measuring sensors are known, as are marketed for example by the Applicant under the product reference "VAST", "VAST XT" or "VAST XTT". In this case, the surface of the workpiece to be measured is sampled by means of a probe pin, the coordinates of which in the measurement space are constantly known. Such a probe pin may also be moved along the surface of a workpiece, so that, in such a measuring process, a multiplicity of measurement points can be acquired at fixed time intervals in the scope of a so-called scanning method.

Furthermore, it is known to use optical sensors which permit contactless acquisition of the coordinates of a workpiece. An example of such an optical sensor is the optical sensor marketed by the Applicant under the product reference "ViScan".

The sensors may then be used in various types of measurement structures. One example of such a measurement structure is the product "O-INSPECT" of the Applicant. In such a device, both an optical sensor and a tactile sensor are used in order to carry out various inspection tasks on a machine and, ideally, with single clamping of a workpiece to be measured. In this way, all inspection tasks, for example in medical technology, plastics technology, electronics and precision mechanics, can be carried out in a straightforward way. Of course, various other structures may furthermore be envisioned as well.

Such sensor systems or sensor heads, which carry both tactile and optical sensors, are of increasing importance in coordinate measurement technology. A combination of tactile and optical sensors makes it possible to combine the advantages of the high accuracy of a tactile measurement system with the speed of an optical measurement system in a single coordinate measuring device. Furthermore, calibration processes when changing sensors are avoided, as is possible reclamping of a workpiece.

Conventionally, the sensor head, which may also be referred to as a sensor system, is connected to a carrier system which supports and moves the sensor system. Various carrier systems are known in the prior art, for example portal systems, stand, horizontal arm and arm systems, all types of robotic systems and finally closed CT systems in the case of sensor systems operating with X-rays. The carrier systems may comprise further system components which permit maximally flexible positioning of the sensor head. One example of this is the rotation/swivel articulation of the Applicant marketed under the reference "RDS". Furthermore, various adapters may be provided in order to connect the different system components of the carrier system to one another and to the sensor system.

In the context of the present invention, a "system component" is intended to mean any such element of the carrier system and the sensor head per se. Thus, the sensor head as such forms a system component. Furthermore, for example, an adapter as such forms a system component, a rotation/swivel articulation forms a system component, a portal of a portal structure forms a system component, a changer magazine forms a system component, etc. The present invention therefore relates to all interface arrangements of any two such system components.

In coordinate measuring devices having tactile sensor systems, in order to couple two system components a so-called "adapter plate" or adapter surface is conventionally provided on each of the system components. The adapter surfaces are configured in such a way that they can be applied on one another and permit interchange of data in two directions, for example measurement data and/or control signals. Conventionally, these adapter surfaces are constructed according to a particular pattern or standard, in order to be able to couple different system components arbitrarily to one another, for example different sensor heads on a rotation/swivel articulation, etc. Besides this, it is also important for the adapter surfaces to be arranged relative to one another as accurately reproducibly as possible. Otherwise, the calibration outlay after replacing a system component would increase enormously. In general, a so-called three-point bearing is used for this, which advantageously provides three bearings respectively offset by 120° from one another, distributed over the adapter surface. Each of these bearings limits a lateral movement of the adapter surfaces of the two system components to be coupled to one another, so that a unique orientation and arrangement of the two system components relative to one another is made possible. The three-point bearing is generally provided with an outer, in particular annular, outer region of the adapter surfaces. The outer region encloses a central region. An electromagnetic holding device is generally provided in this central region. In this case, one system component, in particular the system component on the carrier system side, comprises an electromagnet and the other system component, generally the system component on the sensor head side, comprises an armature disk or flux guiding parts. In this way, the two system components can be pressed onto one another firmly in the three-point bearing by means of the electromagnet. Of course, coupling by means of two permanent magnets is also possible.

So far, the data rate for transmission has been limited to about 80 to 100 megabits. This, however, is too low for data transmission of modern camera systems, since an image size of one megapixel and a resolution of 8 bits per image incurs 1 MB of data. A data rate of 25 or 50 images therefore respectively entails 50 megabits or 400 megabits of data for transmission. This is more than can at present be transmitted with modern radio transmission paths. Standard technologies currently end there at 300 megabytes for second generation WLAN. Furthermore, radio transmissions usually cannot be carried out continuously with full bandwidth, which makes continuous measurement even more difficult, or even prevents it. With known technologies, consequently, efficient transmission of large image data quantities is scarcely possible. In this context, relatively large sensors comprising several megapixels as well as data rates at 100 to 150 Hz are usual in modern camera systems. Likewise, there is a trend toward higher digital resolutions of 10 bits or 12 bits, which correspondingly increases the amount of data involved, even in the case of relatively small sensors.

In machine tools, radio transmission systems are often used for coordinate measurement data. However, since only tactile sensors are used in this case, the data rates are much lower. Typically, only a few hundreds of measurement points are then taken per second. This data transmission is therefore readily possible with standardized conventional radio transmission systems. The problem for the coordinate measuring devices thus arises specifically when the sensor used is suitable for fast measurements and therefore also high data rates. This problem hence occurs particularly in the case of fast-scanning or optical sensors. Fast-scanning sensors usually operate optically and involve individual detectors or detector arrays, as can be produced for example with cameras based on CCD or CMOS. Here, therefore, the same task always typically arises of transmitting large incurred amounts of data rapidly, efficiently and with the least possible interference by the system to the evaluation unit.

Furthermore, documents DE 10 2004 014 153 A1, EP 0 362 625 A2, DE 200 08 721 U1 and WO 2008/098716 A1 disclose devices for coupling various objective arrangements onto an optical sensor head.

To date, however, the prior art has lacked interface arrangements which permit flexible arrangement of both tactilely and optically measuring sensor heads in coordinate measuring devices with effective energy transmission and high data transmission rates.

BRIEF SUMMARY OF THE INVENTION

It is an object of the present invention to improve an interface arrangement of a system component of a coordinate measuring device, or respectively to improve a coordinate measuring device.

According to a first aspect of the invention, it is therefore provided a method for coupling a first system component and a second system component of a measuring device for determining by means of at least one sensor a property of an object to be measured, the method comprising the steps of providing an interface arrangement between the first system component and the second system component, wherein the interface arrangement is provided with at least one electrical interface, formed from at least two electric transmission paths, for transmitting a first electrical voltage between the first system component and the second system component, and with at least one optical interface formed at least from light waveguides; supplying at least the at least one sensor with the first electrical voltage by means of at least two electrical transmission paths of the electrical interface; transmitting, by means of the light waveguides of the at least one optical interface, a measurement signal acquired by means of the sensor; and providing at least one electrical identification transmission path for transmitting an identification signal for identifying a system component between the first system component and the second system component.

According to a second aspect of the invention, it is provided a method for coupling a first system component and a second system component of a measuring device for determining by means of at least one sensor a property of an object to be measured, wherein an interface arrangement is provided between the first system component and the second system component, wherein the interface arrangement is provided with at least one electrical interface, formed from at least two electric transmission paths, for transmitting a first electrical voltage between the first system component and the second system component, and with at least one optical interface formed at least from light waveguides, wherein at least the at least one sensor is supplied with the first electrical voltage by means of at least two electrical transmission paths of the electrical interface, and wherein a measurement signal acquired by means of the sensor is transmitted by means of the light waveguides of the at least one optical interface.

In other words, there may be provided a method for coupling a first system component and a second system component of a measuring device for determining by means of at least one sensor a property of an object to be measured, the method comprising the steps of providing an interface arrangement between the first system component and the second system component, wherein the interface arrangement is provided with at least one electrical interface, formed from at least two electric transmission paths, for transmitting a first electrical voltage between the first system component and the second system component, and with at least one optical interface formed at least from light waveguides; supplying at least the at least one sensor with the first electrical voltage by means of at least two electrical transmission paths of the electrical interface; transmitting, by means of the light waveguides of the at least one optical interface, a measurement signal acquired by means of the sensor.

In particular, the measuring device is a coordinate measuring device and three-dimensional coordinates of the object to be measured are the property.

In particular, provision may be made that the measurement signal is an analog measurement signal and the analog measurement signal is converted into a digital measurement data signal, and that the digital measurement data signal is transmitted by means of the light waveguides of the at least one optical interface. As an alternative or in addition, however, transmission of the measurement signal may also be carried out in analog form by means of the light waveguides of the at least one optical interface.

According to a third aspect, it is furthermore provided a measuring device for determining by means of at least one sensor a property of an object to be measured, having a first system component and a second system component, wherein an interface arrangement is formed between the first system component and the second system component, wherein the interface arrangement comprises at least one electrical interface, formed from at least two electrical transmission paths, for transmitting electrical energy between the first system component and the second system component, and at least one optical interface formed at least from light waveguides, wherein the at least one sensor is connected to the at least two electrical transmission paths in order to be supplied with electrical energy, and wherein the measuring device is furthermore configured in such a way that transmission of the measurement signal acquired by means of the sensor takes place via the at least one optical interface, and wherein at least one electrical identification transmission path is provided for transmitting an identification signal for identifying a system component between the first system component and the second system component.

According to a fourth aspect, there is provided a measuring device for determining by means of at least one sensor a property of an object to be measured, having a first system component and a second system component, wherein an interface arrangement is formed between the first system component and the second system component, wherein the interface arrangement comprises at least one electrical interface, formed from at least two electrical transmission paths, for transmitting electrical energy between the first system component and the second system component, and at least one optical interface formed at least from light waveguides, wherein the at least one sensor is connected to the at least two electrical transmission paths in order to be supplied with electrical energy, and wherein the measuring device is furthermore configured in such a way that transmission of the measurement signal acquired by means of the sensor takes place via the at least one optical interface.

In particular, the measuring device is a coordinate measuring device and three-dimensional coordinates of the object to be measured are the property.

In particular, provision may in this case be made that the coordinate measuring device furthermore comprises an analog-digital-converter for converting an analog measurement signal acquired by means of the sensor into a digital measurement data signal, which is connected to the optical interface in such a way that transmission of the digital measurement data signal takes place via the at least one optical interface. As an alternative or in addition, however, transmission of the measurement signal may in this case also be carried out in analog form by means of the light waveguides of the at least one optical interface.

In particular, transmission of the digital measurement data signal via the at least one optical interface to a computation unit of the coordinate measuring device may be carried out. Furthermore, in particular, provision may be made in this case for the supply of the sensor with electrical energy via the at least two electrical transmission paths to be supply of the sensor with a first electrical voltage.

With the disclosed solution, a new cabling system for a coordinate measuring machine is proposed. The known basics of contemporary systems are in this case intended to be developed further. Owing to the aforementioned restrictions in relation to the electrical transmission paths, further optimization of the electrical transmission elements does not seem expedient since extension of the transmission bandwidth by at least one order of magnitude would need to be achieved. When using the conventional methods, this is only possible with restrictions. For this reason, it is proposed to fundamentally change the data transmission principle. Data transmission via light guide fibers and over large distances is known from telecommunications. High data rates in the range of several gigabytes or even several hundreds of gigabytes are also possible. However, such systems are constructed with fixed interfaces. At these interfaces, for example, different light guide cables are firmly connected to one another by means of a coupler. Besides switching properties for changing a light guide cable, this coupling may also contain an amplifier unit to amplify the incoming signal suitably for transmission over a further long distance and to compensate for the line attenuation. In coordinate measuring machines, the aforementioned problem arises that the different components of the machine must be replaceable, or alternatively connection via one or more of the rotation axes must be provided. For these tasks, there is not yet any solution.

A further advantage is the galvanic separation at least for the measurement data signal. The proposed solution makes it possible in coordinate measurement techniques to use sensor heads comprising a plurality of sensors, in particular a tactile measurement sensor and an optical measurement sensor, and to provide suitable data transmission widths on the adapter interfaces present in the coordinate measuring devices. As structurally dictated by the proposed solution, all data of the sensors need to be digitized before transmission. This is not the case in coordinate measuring devices known from the prior art. The measurement data signals of the at least one sensor, which are digitized in this way, can then be coupled via a suitable driver module for light guide fibers, or light waveguides, into the optical transmission path provided by means of the light waveguides. Besides the pure digitization in the analog/digital converter, the latter may also carry out compression of the measurement data. For example, only subregions such as an AOI (area of interest) or ROI (region of interest), of the sensor may be transmitted. Reduction to measurement data which exceed or fall below a certain limit value, i.e. a significance limit, may also be carried out. This data reduction in this case helps to reduce the amount of data to be transmitted, without even higher-performance transmission lines having to be provided for this.

Lastly, the proposed method and the proposed coordinate measuring device lead to a minimization of the number of required lines, or electrical and optical transmission paths, over adapter interfaces. In this way, a stiffness of the cable harness in the coordinate measuring devices can be reduced. This has an advantageous effect on a mechanism of the coordinate measuring devices, and allows an improvement of the accuracy in the measurements. In this way, smaller dimensioning of the kinematics and of the carrier system of the coordinate measuring device is also made possible, which saves on material, outlay and therefore costs. Owing to the lower masses to be installed, the coordinate measuring device can be moved more rapidly without infringing specifications of the safety technology concerning maximum kinetic energy and pinching forces. Lastly, as required, a transmission data rate is increased and reliable and rapid transmission even of relatively large amounts of data is provided.

Digitization of measurement data should be configured with the least possible losses and the lowest possible electrical power. The generation of heat is thereby reduced, and the metrological stability thus is thereby increased. Furthermore, it is advantageous when the digitization is/can also be carried out very rapidly while still having low losses. Since a high computation speed always leads to more dissipation of heat, an adjustable digitization speed and/or data depth (in bits per data point) may also be possible in order to optimize the heating. The above-described data compression, or the transmission of selected regions (AOI, ROI), also contributes to this.

In comparison with electrical data transmission in a bus system, the proposed optical data transmission has the advantage that it is not constantly necessary to work constantly against a terminating resistance, for example 50 ohms or 75 ohms. There is a continuous power loss at a terminating resistance. In the case of optimized printed circuit boards, the greatest proportion of the power loss may occur precisely at this terminating resistance.

In the case of optical data transmission, a plurality of optical digital transmission paths, which exist next to one another entirely without interference, can also be formed with separate wavelengths on an optical fiber. Separation of the transmission paths is then possible with a beam splitter, for example dichroic beam splitters, or normal beam splitters and a color filter as a bandpass or interference bandpass filter. Depending on the type of fiber, different spectral ranges (wavelength ranges) can be transmitted on an optical fiber. In the case of mono-mode fibers, the bandwidth covers almost one octave, i.e. just under a factor of 2 in frequency/wavelength. In the case of low-mode fibers or multimode fibers, this ratio is somewhat more favorable. Advantageously, the carrier frequencies of the lasers of neighboring frequencies should lie apart from one another by somewhat more than the maximum modulation frequency. Wavelength multiplexing is also possible.

In particular, a low-mode fiber may be used in order to form an optical transmission path. These are distinguished by simple input coupling compared with a single-mode fiber. Although the attenuation is greater than in a single-mode fiber, and the propagation distances in measuring devices, particularly in coordinate measuring devices, are nevertheless at most 100 meters, so that the attenuation is not of importance. Besides the above-described transmission of digital signals, an analog signal which lies in a different wavelength range may also be transmitted. One example might, for example, be the signal or the illumination light for a chromatic white light sensor. Measurement could be carried out here in the visible spectral range with the sensor. Single- or multi-channel data transmission of digital data could then also take place in the near infrared range, as mentioned above.

The data to be transmitted on the optical transmission path may also be control data of the machine, so that, besides the data of optical sensors, it is also possible to transmit the digitized data of encoders, measuring scales, a time signal or the signals of tactile sensors. These communication data may also be transmitted in two directions, i.e. from an evaluation unit to the sensor or from the sensor to the evaluation unit. By multiplexing of the wavelength, it is also possible for some wavelengths to perform data transmission in both directions and others in only one direction, for example preferably from the sensor to the evaluation unit.

Particularly in the case of the transmission of a plurality of wavelengths, a further signal with a further wavelength may additionally be coupled onto the optical transmission path within a system component, and naturally the relevant wavelength for this system component may also be coupled out. One example of this might be an encoder or the complete drive for an axis of the measuring device.

In the measuring device, rotary transmitters may also be installed in the optical transmission path, for example in said RDS as a rotation/swivel articulation. For a low-loss, or low-attenuation rotary transmitter, arrangement on the corresponding rotation axis is particularly advantageous for efficient optical coupling. The rotary transmitter on the axis then also profits from the superimposed wavelengths when a plurality of channels, or more data volume, needs to be transmitted, since only one transmitter can be positioned on the axis per rotation axis.

In a further refinement of the method according to the first aspect of the invention, provision may be made for the interface arrangement to be furthermore provided with a further electrical interface having at least two further electrical transmission paths for transmitting a second electrical voltage between the first system component and the second system component, and for at least one logic circuit to be supplied with the second electrical voltage.

Correspondingly, in the coordinate measuring device according to the second aspect of the invention, provision may also be made for the interface arrangement to be furthermore connected to a further electrical interface having at least two further electrical transmission paths for transmitting a second electrical voltage between the first system component and the second system component, and for at least one logic circuit to be connected to the two further electrical transmission paths in order to be supplied with the second electrical voltage.

The level of the second voltage may, or should, be orientated toward the requirements of the logic modules. For example, 2 volts, 2.5 volts, 5 volts, 12 volts, 15 volts or 24 volts are possible. Since the logic modules usually accept a certain input voltage range, the supply voltage, or the second voltage, may be selected to be somewhat higher in order to compensate for power losses on the path from the voltage source to the logic module. In the case of two electrical transmission paths, these may for example on the one hand be grounded and on the other hand, for example, be supplied with 5 V. In principle, it is also possible for the second voltage to be provided as a symmetrical voltage. In this case, three electrical transmission paths are provided, one being ground and the other two respectively being supplied with +5 V and −5 V.

According to a refinement of the invention, provision may be made for three electrical transmission paths to be provided for transmitting the first electrical voltage between the first system component and the second system component, and for the first electrical voltage to be transmitted as a symmetrical voltage.

Thus, in terms of the corresponding electrical interface, transmission through three electrical transmission paths is also possible in relation to the first voltage. There is therefore the option of simple voltage supply by means of two electrical transmission paths or symmetrical voltage supply via three electrical transmission paths, as described above. By means of the separation between power loads, mutual influence, for instance crosstalk, is intended to be prevented before the sensor and further power loads, for example drivers, on the one hand, and logic circuits on the other hand, and the electromagnetic compatibility (EMC) is intended to be improved. This applies in particular for the influencing of emergency switches by power loads.

In a further refinement, provision may be made for the at least one logic circuit to be supplied at least indirectly with the first voltage.

With suitable filter and protection circuits, which may for example also be configured in the form of integrated modules, separation between a supply network with the first voltage and a supply network with the second voltage may optionally be obviated. To the extent of minimizing a power loss at the logic modules, for example, DC converters may be used.

In this regard, in a further refinement, provision may be made for the first voltage to be converted by means of a DC converter into an operating voltage of the at least one logic circuit.

In principle, provision may furthermore be made for further power loads to be supplied with the first voltage.

Besides the sensor, as already mentioned above, further power loads, for example drivers, illumination devices etc. may also be supplied with the first voltage.

In a further refinement, provision may be made for three further electrical transmission paths to be provided for transmitting a second electrical voltage between the first system component and the second system component, and for the second electrical voltage to be transmitted as a symmetrical voltage.

As described, for the electrical network for transmitting the second electrical voltage, the possibility also exists of providing three further electrical transmission paths in the interface arrangement, and of transmitting the second voltage as a symmetrical voltage. In this case, one electrical transmission path is grounded, a further is supplied with the positive applied voltage and a third is supplied with the negative applied voltage.

In a further refinement, provision may be made for at least one, in particular at least two, electrical identification transmission paths to be provided for transmitting an identification signal for identifying a system component between the first system component and the second system component.

This so-called ID cabling is typically configured with two transmission paths. In this case, the system components located in the coordinate measuring device may be uniquely identified either by means of a resistor, a combination of a resistor and a protective diode, or by means of so-called ID chips. These transmission paths may be retained, or may be added to the transmission paths proposed below via a light guide fiber or a light waveguide.

In another refinement, provision may be made for a plurality of signals to be transmitted in parallel by means of the light waveguides of the at least one optical interface.

In the case of simultaneous parallel transmission, it is necessary to take care that no superposition and interference of parallel transmission paths in the same light guide fiber or the same light waveguide occurs. Any driver modules for coupling a digital measurement data signal into the light waveguides therefore need to be provided with suitable transmission wavelengths which permit parallel transmission and a plurality of data signals over a light waveguide.

As an estimate, so-called single-mode fibers are used as the light waveguides. Digital signals for a plurality of lasers with different frequencies can be transmitted in parallel in these fibers. Instead of lasers, modulated diodes may naturally also be used. By superposition of the different wavelengths or frequencies, the high transmission bandwidth of the light waveguides can be used together multiply in parallel. In this way, for example, it is possible to transmit the data of a plurality of sensors in parallel. Furthermore, control data of the machine may be transmitted on a further channel. For example, data of triggers or synchronization signals, a controller area network (CAN) bus, or the identification signal, may be jointly transmitted on this line. In this way, with an increase in the transmission capacity for the measurement data of a sensor, it is additionally possible also to transmit control data of the system on the same line. In this way, by means of an optical transmission path with one wavelength, it is possible to transmit amounts of data which would otherwise require some ten to a hundred electrical transmission paths or lines. Particularly in the case of more than one sensor, in particular a tactile sensor and an optical sensor, this ratio may be increased even further.

In a further refinement, provision may be made for a synchronization signal to be transmitted between the first system component and the second system component by means of the light waveguides of the at least one optical interface.

As an alternative, an electrical transmission path may of course also be used for transmitting the synchronization signal.

The synchronization signal is intended to mean a time synchronization or trigger signal, which temporally synchronizes the individual elements of the coordinate measuring device. In this way, measurements of the sensors can be matched to the positions of a carrier system, or kinematics of the coordinate measuring device.

In a further refinement, provision may be made for an identification signal for identifying a system component to be transmitted between the first system component and the second system component by means of the light waveguides of the at least one optical interface.

As already mentioned above, it is thereby possible to save on an electrical transmission path. In this case, the corresponding ID chip of the respective system component, or the corresponding resistor, needs to be read out and the file needs to be provided to the light guide by means of corresponding coupling.

By transmission of the relevant data exclusively via an optical transmission path, it is possible to implement galvanic separation of this data transmission from the power supply on the electrical transmission path. In this way, the EMC security is increased and the necessary inspection outlay is reduced. Furthermore, separation of the electrical transmission paths into a network with a first voltage and a network with a second voltage makes it possible to avoid problems which may result from the sequence in which the electrical contacts are closed at the adapter interfaces. If one network or at least an equal ground reference is used, it may happen that temporary crosstalk from the power supply to the supply of the logic circuits may lead to damage in logic circuits in the system. The proposed separation avoids these problems.

As an alternative, it is possible for the driver module for the supply of the light guide cable not to be arranged until after the first adapter interface as seen from the sensor. In this way, the sensor can electrically transfer the digital data on a very short data path. This avoids the sensor transmitting into the light waveguide with the wrong wavelength. Furthermore, electrical contacts are typically more robust against dust and dirt in production environments. The sensor head is still exposed most strongly and directly to these conditions. For the data transmission in continuous rotation axes and in order to bridge the usually unavoidable adapter interfaces in coordinate measuring devices, in principle the same technology may be used. For a further refinement, a GRIN lens is placed before the end of the light guide fibers. The purpose of this lens is to collimate the light beam emerging divergently from the fiber. The adapter interfaces in the CMD are configured very robustly and reproducibly. In this way, the gap between the two parts of the interface, and also their relative position with respect to one another, are determined very well. A GRIN lens, which is used to couple the light into a subsequent further fiber, is in turn likewise arranged in the opposite part of the interface. By virtue of the parallel light beam in the gap, the gap can be bridged very simply and without great losses. In order to avoid losses when coupling the light in and out at the fiber ends and at the lens surfaces, these may correspondingly be optically bloomed. Typically, antireflection coatings are used or the fiber ends are cut slightly obliquely, or the fibers are positioned or a slight angle, in order to avoid influences due to single and multiple reflections.

If the point of separation is a rotation axis, the described coupling mechanism must be arranged as accurately as possible axially in order to achieve a maximally efficient coupling. In other regards, the other comments in the previous section apply. A particular feature of rotation axes is that only such an arrangement can be mounted on the axis. A serial arrangement of a plurality of such coupling positions along the rotation axis, which is intended to rotate continuously through a multiple of 360 degrees, is technically not possible since all off-axial lines likewise need to be separated already at the first point of separation. Then, however, the input coupling would at least be very greatly modulated, if not even interrupted, by the rotation. For this reason, it is proposed then to transmit a plurality of wavelengths, and therefore a plurality of data channels, in parallel via a central fiber connection, i.e. a fiber connection extending coaxially with respect to a rotation axis, with the corresponding coupling lenses. This solution is particularly preferred since it can be configured very compactly and functionally reliably. As an alternative, it is also possible to work around this one central channel with so-called ring couplers. This significantly limits the number of interfaces which lie on the transmission path. For compensation for the transmission losses, signal amplifiers likewise need to be installed in the transmission path. This additional outlay can be substantially avoided with the solution described above. In comparison with standard applications with light guide fibers, in this case optical coupling members which do not require any direct mechanical connection between the two fiber parts, or the lenses used, are employed.

Once this cabling system has been installed with light fibers for the sensors, the corresponding system may also be used for further technology in the coordinate measuring device. For example, the appropriate motor driver modules may be fitted directly on the motors and may be connected to the power supply, optionally the voltage supply for the logic, optionally the ID cabling and the light waveguide for the data transmission. The control or position instructions for the motor can then be transmitted on the light waveguide. In the opposite direction, the actual position signal, which is read for example by a measurement system or encoder, can then be transmitted from the motor assembly to a controlling unit. Since this transmission may also be configured as bus transmission, the different assemblies or system components may be cascaded in succession on the same line. In comparison with contemporary machine cabling, the system outlay is thereby reduced considerably since each motor now does not then need to be connected separately with cables. The advantage is that, with fewer cables, the lines for the power supply can be configured with a larger cross section and therefore lower losses. This can be used so that the machine can be operated using nominally the same voltage supply with a higher power, or higher functional reliability, since more power reaches the motor itself because of reduced cable losses. In total, the total cross section of the cables in the device can be reduced, and furthermore the functional reliability of the overall system can also be increased. In functional terms, the reduced outlay on cables means that the mass of the device can be reduced, and the dynamic range for the measurement operation can therefore correspondingly be increased.

Besides pure optical coupling over the points of separation, coupling with a receiver is naturally also possible. The signal received by the receiver would then be fed into a further transmitter which supplies a further light guide fiber. Depending on the length of the transmission path and the losses at the points of separation and transmission, however, an amplifier stage may possibly be required in the optical light guide.

It is to be understood that all features of a coordinate measuring device mentioned above in relation to the proposed method may also be features of the proposed coordinate measuring device. The same applies for features explained in connection with the proposed coordinate measuring device, which may also form features of the proposed method.

It is to be understood that the features mentioned above and those yet to be explained below may be used not only in the combination respectively indicated, but also in other combinations or individually, without departing from the scope of the present invention.

BRIEF DESCRIPTION OF THE SEVERAL VIEWS OF THE DRAWING

Exemplary embodiments of the invention are represented in the drawing and will be explained in more detail in the description below.

FIGS. 11a to 11c show possible embodiments of an optical interface device, or an optical interface, between a first system component and a second system component.

DETAILED DESCRIPTION OF THE INVENTION

Figure 1:
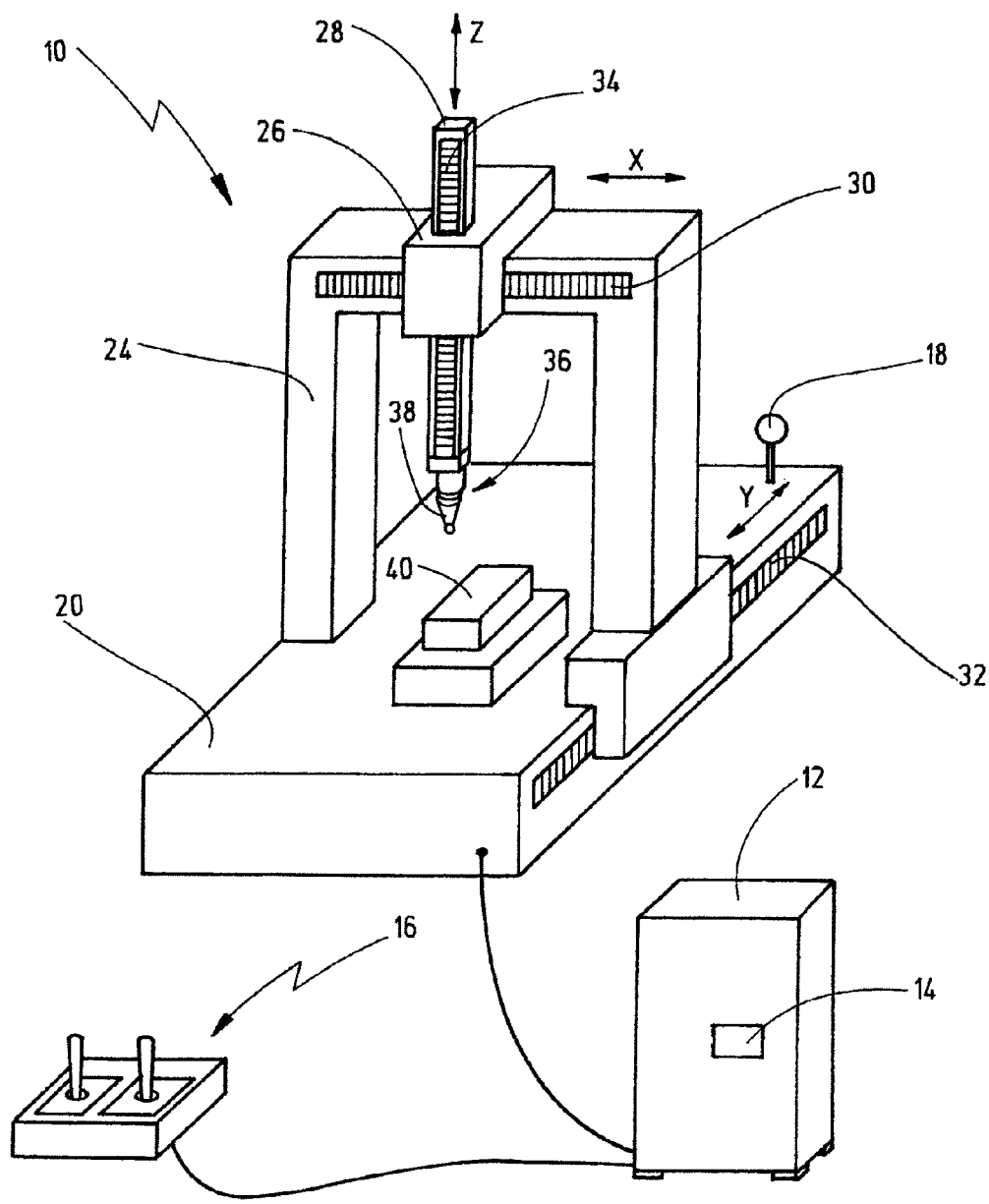
FIG. 1 shows a schematic view of a measuring device.

FIG. 1 shows a measuring device, which is formed as coordinate measuring device 10. In principle, the measuring device may also be a part of a machine tool or manufacturing machine. The invention will, however, be described below with reference to the example of a coordinate measuring device 10.

The coordinate measuring device 10 comprises a control unit 12 for controlling the coordinate measuring device 10. The control unit 12 comprises a computation unit 14, for example a computer.

The control unit 12 is represented merely schematically as a block, although in principle the control unit 12 may comprise all elements necessary for controlling the coordinate measuring device 10, for example keypads, monitors or a control panel 16. Furthermore, the control unit 12 also comprises an output means in order to output the data obtained by the coordinate measuring device 10 in a suitable form, for example electronically or in paper form. Although the coordinate measuring device 10 may also be operated manually by means of the control panel 16, the control unit 12 is also capable of carrying out measurement and calibration processes in an automated fashion.

Furthermore, the coordinate measuring device 10 may comprise a calibration ball 18. The calibration ball 18 is arranged on a base plate 20 of the coordinate measuring device 10. The calibration ball 18 is used for calibrating the coordinate measuring device 10; such a calibration method is described, for example, in Document EP 1 051 596 B1. This method is used for determining correction parameters of the coordinate measuring device 10, for example a flexibility matrix.

Provided on the base plate 20 in the embodiment represented, there is a portal 24 which can be displaced on the base plate 22 along a first axis (Y). A carriage 26, which can be displaced along the portal 24 in a second direction (X), is in turn provided on the portal 24. A sleeve 28, which can be displaced along the carriage 26 in a third direction (Z), is provided on the carriage 26. The three directions (X, Y, Z) are respectively perpendicular to one another and form the axes of an absolute coordinate system (X, Y, Z).

A scale 30 in the X direction is provided on the portal 24, a scale 32 in the Y direction is provided on the base plate 22, and a scale 34 in the Z direction is provided on the sleeve 28. The scales 30, 32, 34 are used in order to read the position of a sensor 36 fitted on the sleeve 28. To this end, the scales 30, 32, 34 may be formed in such a way that manual reading of the respective coordinate is possible, although in particular the scales 30, 32, 34 are formed in such a way that a respective coordinate can be acquired by a corresponding acquisition device (not represented) and electronically communicated to the control unit 14. The scales 30, 32, 34 are therefore used as position sensors for acquiring the position of the sensor 36.

The embodiment represented in FIG. 1, comprising a portal 24, is merely to be understood as an example. In principle, the present invention may also be used with all other types of structures of the carrier system, for example, besides portal structures such as the PRISMO, CONTURA, ACCURA and UMC ranges of the Applicant, stand structures, arm structures and horizontal arm structures as in the PRO and CARMET ranges of the Applicant, as well as table structures as in the Surfcom and Rondcom ranges of the Applicant, and also single-position structures as in the F25 and O-INSPECT ranges of the Applicant, or alternatively CT structures as in the Metrotom range of the Applicant. Furthermore, use together with robot-supported carrier systems may also generally be envisioned.

In the embodiment represented, the sensor 36 fitted on the sleeve 28 has a probe or probe pin 38, which is mounted flexibly and is used for sampling an object 40 to be measured. In principle, however, the sensor 36 may also be an optical sensor. Lastly, the sensor 36 may also be a sensor which permits combined tactile and optical measurement.

The object 40 to be measured is arranged on the base plate 20 and can thus be sampled and measured by moving the portal 24, the carriage 26 and the sleeve 28.

Figure 2A:
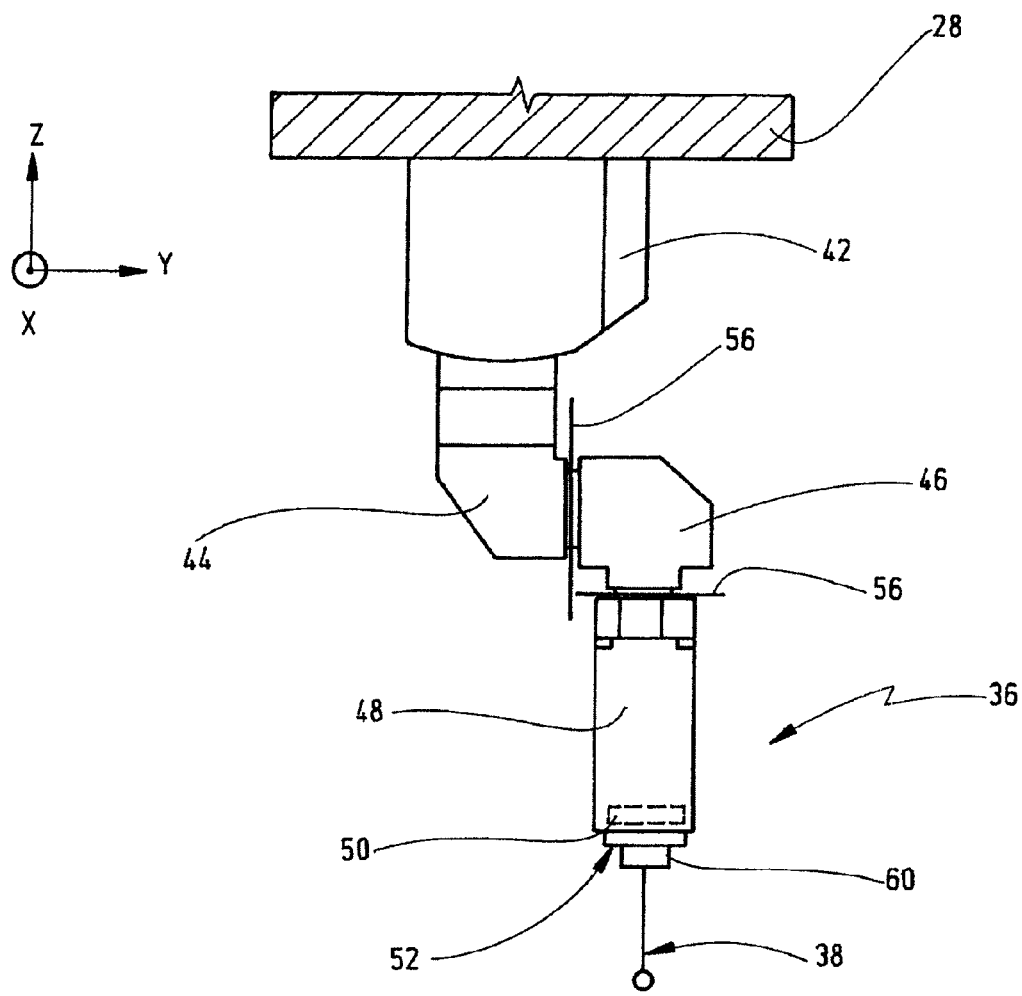
FIG. 2a shows a schematic embodiment of a measuring device with its system components and interface arrangements and a sensor head comprising a tactile sensor.

FIG. 2a shows a schematic view of various system components of the coordinate measuring device 10. A system component may for example be an element of the carrier system, for instance the sleeve 28 in the embodiment represented, or a further fastening device 42. Furthermore, a system component may be formed by a rotation/swivel articulation (RSA) 44 or an adapter 46. Lastly, a sensor head 48 also forms a system component.

In general, a fastening device 42, on which a rotation/swivel articulation (RSA) 44 is provided, is firstly provided on the sleeve 28. The RSA 44 is used to orientate the sensor 36 in an arbitrary direction, in order to be able to position the probe pin 38 suitably on the object 40 to be measured. An adapter 46 is provided on the RSA 44, this being is used to provide a connection between the RSA 44 and the sensor head 48 in order to make it possible to use different sensors 36, or sensor heads 48, with the same RSA 44.

A probe mount 50, which holds a probe pin plate 52, is provided in the sensor head 48. The actual probe 38 is then arranged on the probe pin plate 52. The probe pin plate 52 is arranged in the probe mount 50 while being coupled by corresponding measuring pickups (not represented), which record a deflection of the probe 38, or of the probe pin plate 52, and communicate this to the control unit 14 of the coordinate measuring device 10.

Figure 2B:
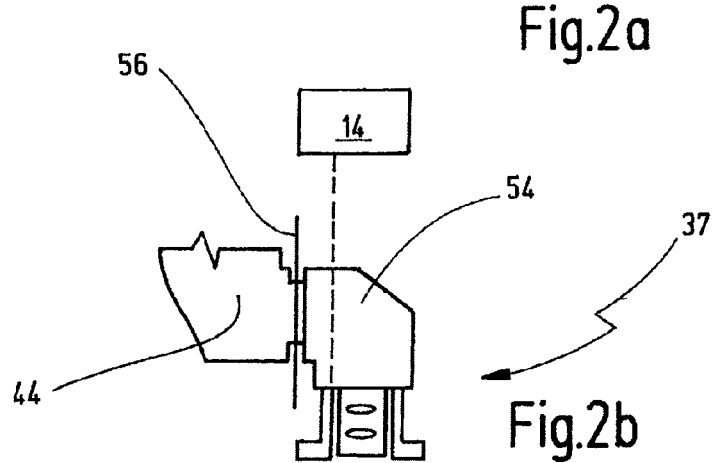
FIG. 2b shows a schematic representation of the measuring device in FIG. 2a with an optical sensor head.

FIG. 2b shows a possible arrangement for the case in which an optical sensor 37 is used. From the sleeve 28 to the RSA 44, the structure is the same as that described in FIG. 2a. However, the RSA 44 is then followed directly by the optical sensor 37, which is formed for example by a camera module 54.

Correspondingly, an interface arrangement 56 may also be formed between the camera module 54 and the rotation/swivel articulation 44. In this case, the camera module 54 then forms a system component and the rotation/swivel articulation 44 forms a system component.

The structure of a coordinate measuring device 10 is represented schematically in FIGS. 2a and 2b. As can be seen, both elements of a carrier system, for example the sleeve 28, the fastening device 42, the rotation/swivel articulation 44, and likewise the adapter 46 and a sensor head 48 or 54, may form a system component.

Figure 3:
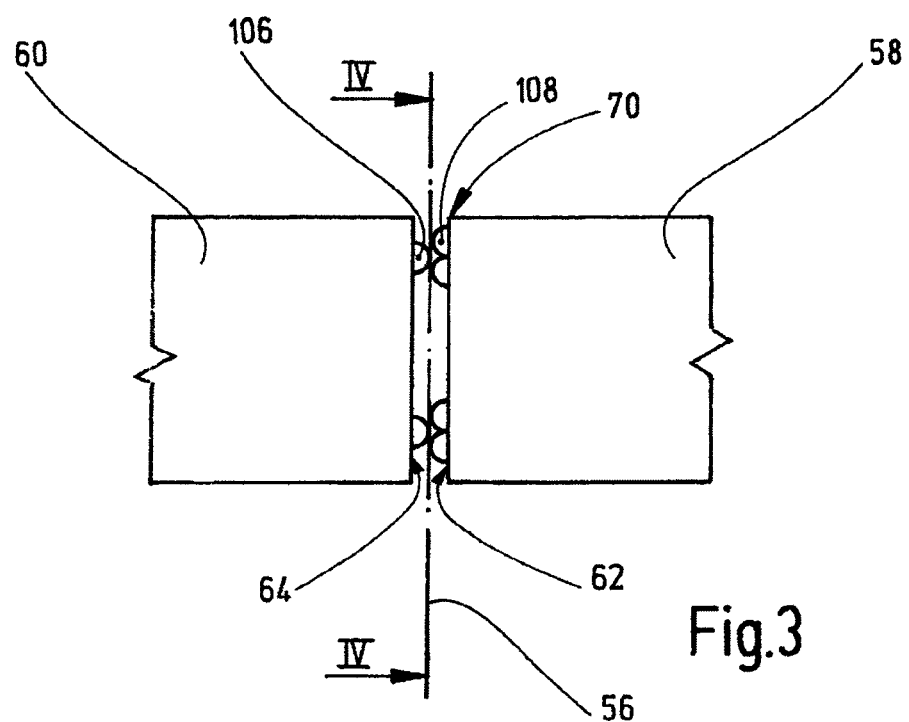
FIG. 3 shows a schematic representation of one embodiment of a first system component, which is coupled to a second system component by means of an interface arrangement.

FIG. 3 schematically represents an arrangement of a first system component 58 and a second system component 60. The first system component 58 and the second system component 60 are connected to one another at an interface arrangement 56. To this end, the first system component 58 comprises a first adapter surface 62 and the second system component 60 comprises a second adapter surface 64. An "adapter surface" is in this case intended to mean that surface of a system component 58, 60 which is connected to a respective other system component 58, 60.

Figure 4:
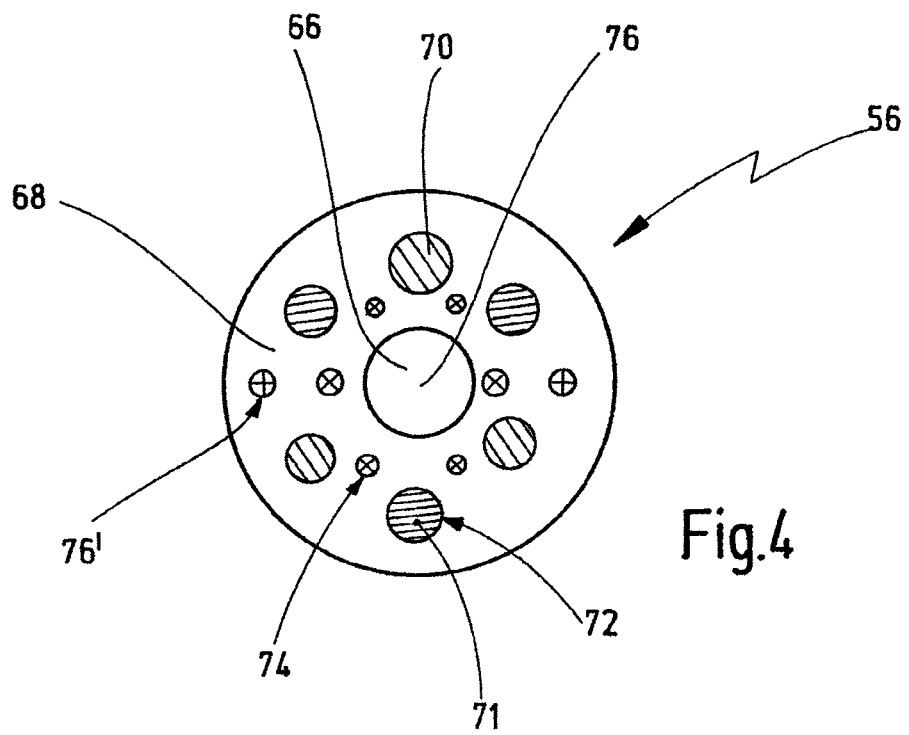
FIG. 4 shows a schematic representation along a section line IV-IV in FIG. 3.

FIG. 4 represents a cross section along a line IV-IV in FIG. 3. FIG. 4 therefore schematically depicts the arrangement of individual interfaces in the interface arrangement 56.

The interface arrangement 56 comprises a central region 66 and an outer region 68 enclosing the central region 66. The central region 66 may be formed free. "Free" is in this case intended to mean that a respective adapter surface 62, 64 has an opening in the central region, through which light can pass.

In principle, an aperture may also be arranged in the central region. For example, this aperture may be configured as an iris aperture, in order to be able to close the free central region 66 if required. Of course, the aperture may furthermore be used also in order to restrict the diameter of a ray bundle passing through the central region 66, as is generally known from optics. Correspondingly, the central region 66 may have a holder (not represented) for such an aperture. For example, interfaces for light waveguides, i.e. optical interfaces, or an electrical interface may also be integrated into such a holder.

In the embodiment represented, the central region 66 is formed circularly. The outer region 68 has a ring shape and encloses the central region 66. Furthermore, other shapes of the central region 66 and of the outer region 68 may of course also be envisioned. In particular for example, provision may, however, also be made for the central region 66 to be formed circularly, but with the outer region 68 having a rectangular contour.

Furthermore, holding elements 71 of a three-point bearing 70 are arranged in the outer region 68. The three holding elements 71 are respectively separated from one another at an angle of 120° over the ring of an outer region 68. The holding device 72 may, for example, be an electromagnetic holding device. For example, provision may be made for electromagnetic coils to be arranged as holding elements 71 in the first system component 58, and for flux guiding elements, or armature plates, to be correspondingly provided in the second system component 60. By actuation of electromagnetic coils in the first system component 58, the armature plates of the second system component 60 can thus be attracted and the system components 58, 60 can be pressed into one another in the three-point bearing.

Furthermore, at least one electrical interface or interface device 74 is arranged in the outer region 68. In the exemplary embodiment represented, five electrical interfaces 74 are arranged rotationally symmetrically in the outer region. However, other types of arrangements may of course also be envisioned. The precise configuration of the electrical interfaces 74 will be discussed in even more detail below.

Furthermore, at least one further optical interface or interface device 76' is arranged in the outer region 68. Firstly, the free central region 66 is used as an optical interface or interface device 76. The further optical interfaces 76 furthermore provided in the outer region 68 may, for example, be provided by light waveguides, as will be mentioned in even more detail below.

Figure 5:
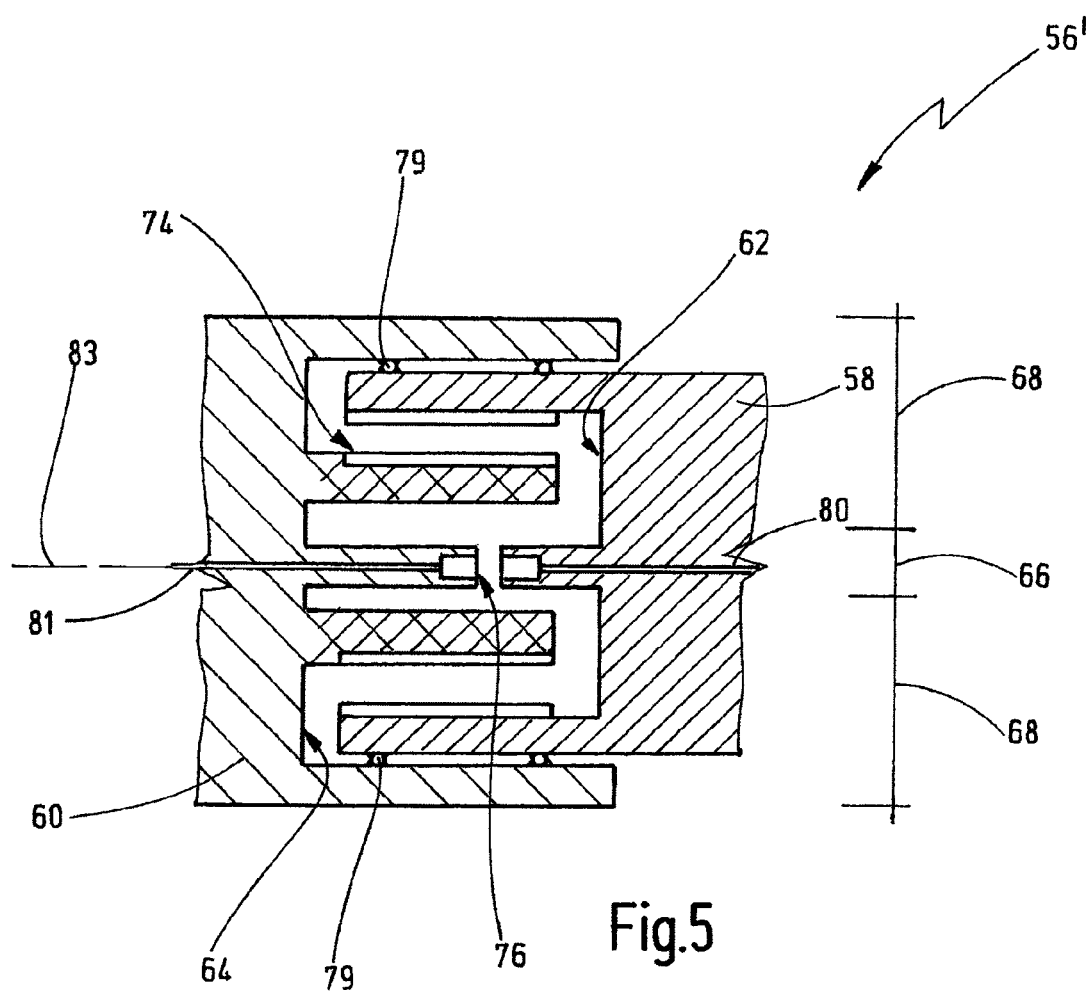
FIG. 5 shows a schematic representation of a further embodiment of a first system component, which is coupled to a second system component by means of an interface arrangement.

FIG. 5 shows a schematic representation of a further embodiment of a first system component 58, which is coupled to a second system component 60 by means of an interface arrangement 56.

This alternative configuration of an interface arrangement 56 is schematically represented by 56'. It may in particular be used in rotation axes, that is to say when the first system component 58 and the second system component 60 execute rotational movements relative to one another.

The central region 66 and the outer region 68 are schematically denoted in the cross section represented. In the proposed embodiment, the optical interface 76 is fed into the central region 66. This makes it possible for the light waveguides 80, 81 of the optical interface 76 to be arranged coaxially with one another with respect to a rotation axis of the first system component 58 and of the second component 60. The rotation axis is denoted schematically by a reference 83.

In this way, transmission of the light from the light waveguides 80 into the light waveguides 81, or vice versa, via the optical interface 76 is made readily possible.

The first system component 58 is mounted in the second system component 60 by means of a plurality of bearings 79. In principle, it is possible for the bearings 79 to be part of an electrical transmission path. For example, grounding may be carried out by them. Furthermore, the electrical interface 76 may be provided in such a way that it is suitable for such rotational connections. This may, for example, be the case using a slip-ring contact. As an alternative, it is also possible for contactless transmission to be provided, for example by means of inductive transmission, in order to provide the electrical interface 74, or one of the electrical transmission paths of the electrical interface 74. The term "transmission path" is therefore not necessarily to be understood as a contacting connection. A "transmission path" may also comprise sections in which transmission takes place without direct contact, that is to say contactlessly.

Figure 6:
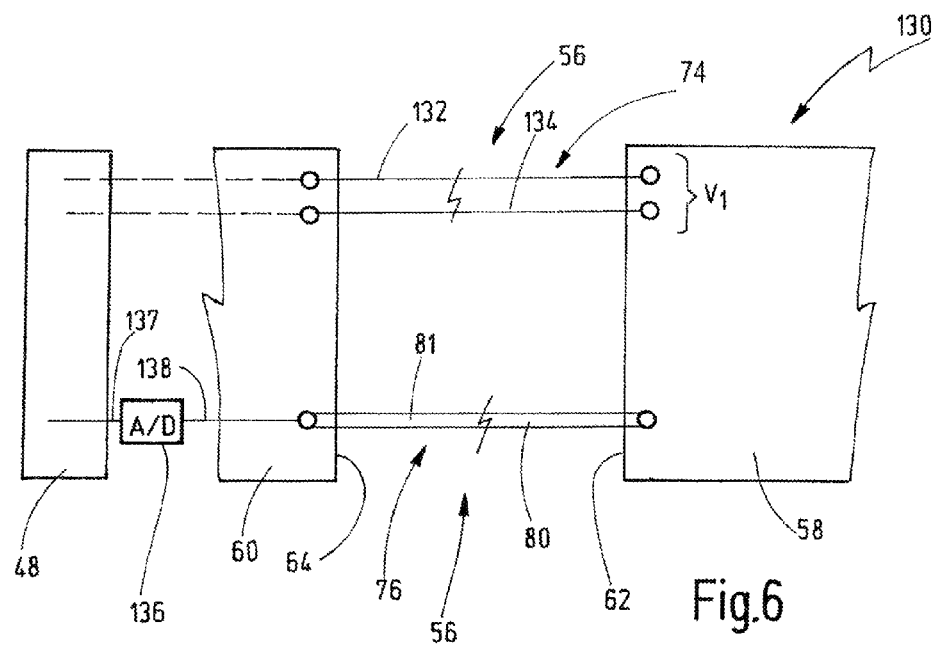
FIG. 6 shows a schematic representation of one embodiment of a method for coupling a first system component and a second system component.

FIG. 6 schematically shows one configuration of the method for coupling the first system component 58 and the second system component 60. The coupling of the first system component 58 and the second system component 60 is in this case carried out by means of the interface arrangement 56, which is schematically indicated in FIG. 6. An electrical interface 74 and an optical interface 76 are formed. The electrical interface 74 comprises two electric transmission paths 132, 134, which transmit a first voltage V1. The sensor 48 is supplied with this first voltage V1.

The optical interface 76 furthermore comprises two light waveguides or light guide fibers 80, 81, from which an optical transmission path is formed. Measurement data of the sensor 48 are transmitted via these. To this end, analog measurement signals 137 of the sensor 48 are converted by means of an analog-to-digital converter 136. The digital measurement data signals 138 obtained in this way are then transmitted by means of the optical transmission path from the second system component 60 to the first system component 58 via the interface arrangement 56. As an alternative or in addition, however, transmission of the measurement signal 137 in analog form may also be carried out by means of the light waveguides 80, 81 of the optical interface 76.

Figure 7:
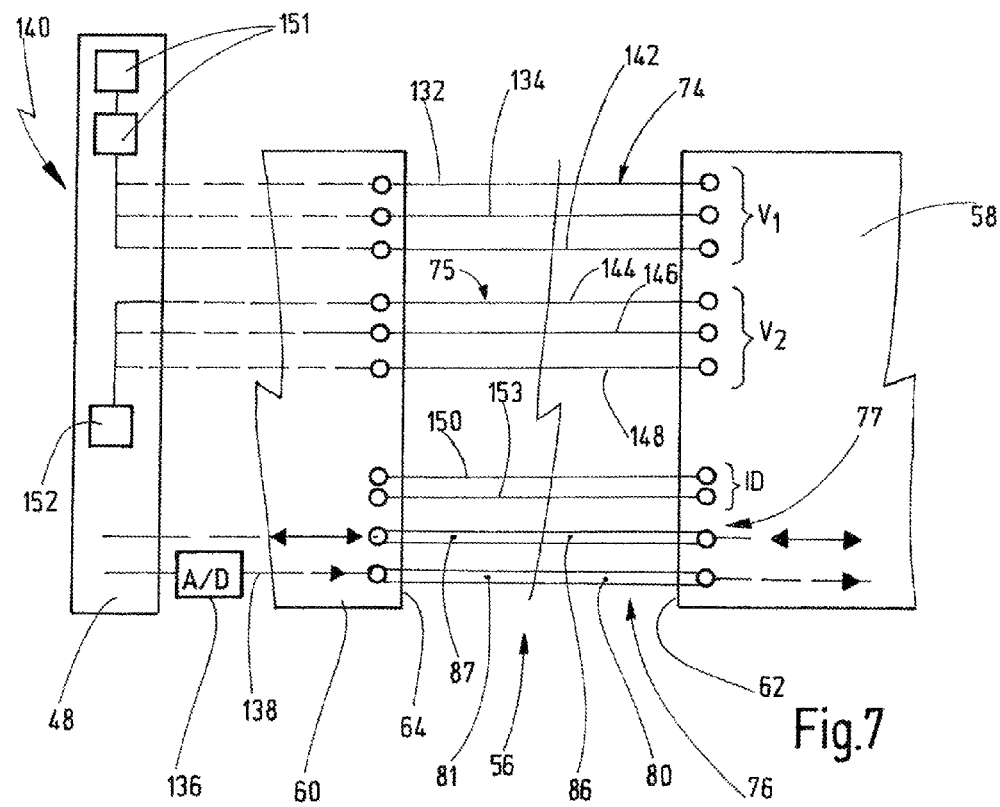
FIG. 7 shows a schematic representation of a further embodiment of a method for coupling a first system component and a second system component.

FIG. 7 represents a further embodiment of the method according to the invention for coupling two system components 58, 60. A configuration of an embodiment of the coordinate measuring device 10 may also be provided correspondingly. Like elements are denoted by like references and will not be described again.

The electrical interface 74 is provided by means of three electrical transmission paths 132, 134, 142. In this way, the first voltage V1 can be transmitted as a symmetrical voltage. The first voltage V1 is used to supply the sensor 48 and further power loads 151.

Furthermore, a second electrical interface 75 is provided, which is likewise formed by means of three electrical transmission paths 144, 146 and 148. By means of these, a second voltage V2 is transmitted. Logic modules 152 are supplied with the second voltage.

Furthermore, two electrical transmission paths 150, 153 are formed over the interface arrangement 56. By means of these, an identification signal can be read and transmitted from one of the system components 58, 60 to a further component (not represented here) of the coordinate measuring device 10. In principle, however, it is also possible to provide only one of the transmission paths 150, 153, when one of the transmission paths 144, 146, 148 or 132, 134, 142 is furthermore jointly used.

In the embodiment represented, the first optical interface 76 is formed unidirectionally and is used to transmit the digital measurement data signals 138. Furthermore, a second optical interface 77 is provided, which is likewise formed from light guide fibers or light waveguides 86, 87. It is formed bidirectionally. That is to say, signals can be transmitted in both directions. The second optical transmission path, formed by means of the light waveguides 86, 87, can therefore be used for communication with the at least one logic module 152, for transmitting data of a CAN bus, for transmitting a synchronization signal of the coordinate measuring device and other data relevant for the operation of the coordinate measuring device.

Figure 8:
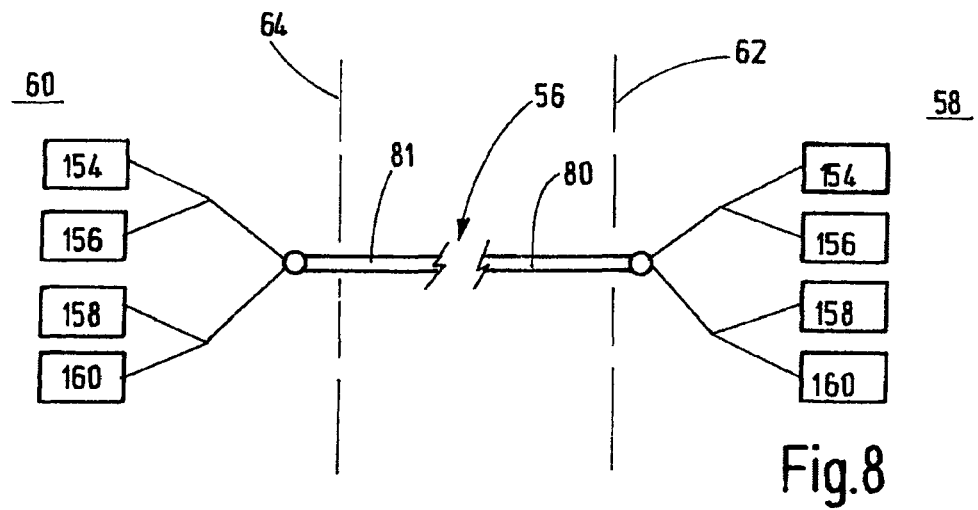
FIG. 8 shows a schematic representation of parallel transmission of a plurality of signals via one light waveguide.

FIG. 8 schematically represents the way in which a plurality of different data signals can be transmitted in parallel on an optical transmission path, formed from the light waveguides 80, 81, via the interface arrangement 56. To this end, a first transmitter 154 and a first receiver 156 are provided for a first wavelength of each of the system components 58, 60. Furthermore, a second transmitter 158 and a second receiver 160 are provided in each of the system components 58, 60 for a second wavelength. In this way, it is possible to transmit two different data signals via the light waveguides 80, 81 by means of two different wavelengths.

A corresponding configuration is of course also obtained for the parallel transmission of three or more data signals.

Figure 9:
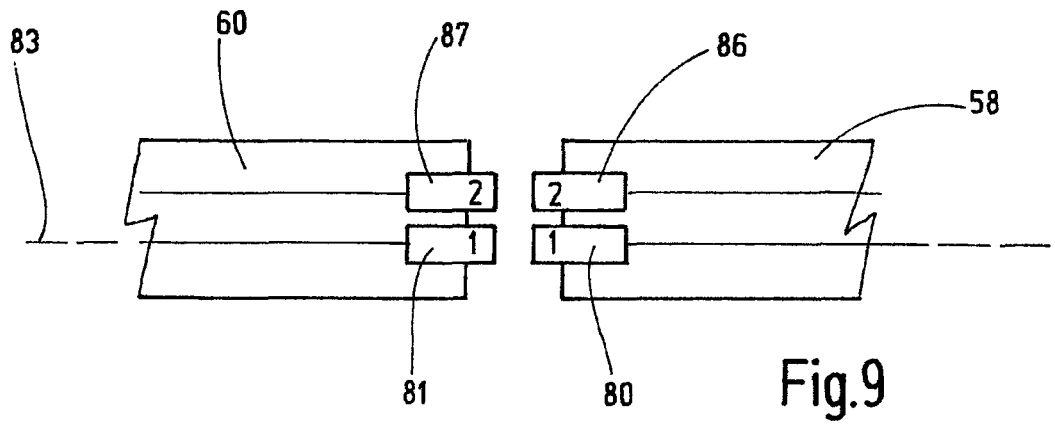
FIG. 9 shows a schematic representation of parallel transmission of a plurality of signals via a plurality of light waveguides.

FIG. 9 schematically represents the way in which, for example, two data signals can be transmitted between the signal components 58, 60. To this end, a first transmission path is formed from the light waveguides 80, 81 and a second transmission path is formed from the light waveguides 86, 87. One of the light waveguides may then be arranged on the rotation axis or longitudinal axis 83, the further light waveguides 86, 87 of the second transmission path correspondingly being arranged off-center. The mutually opposing ends of the light waveguides 80, 81 and 86, 87 can then communicate with one another. Possibilities of coupling the ends of the light waveguides 80, 81 and 86, 87 to one another with the least possible losses will be explained in detail below with reference to FIGS. 11a to 11c and 12a to 12b.

Figure 10:
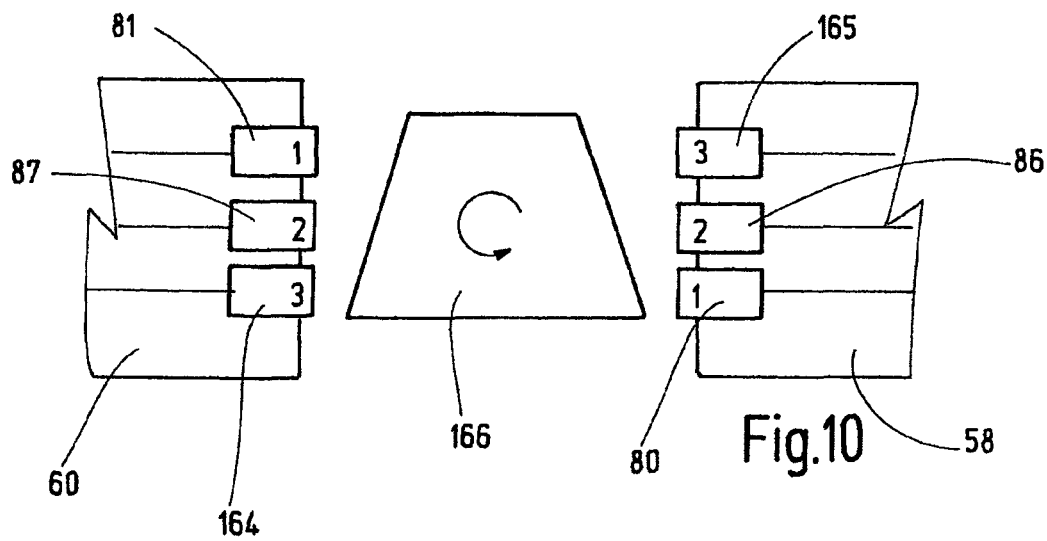
FIG. 10 shows a schematic representation of the coupling of a plurality of light waveguides by means of a prism.

FIG. 10 names a further example of the way in which, in the example represented, three optical transmission paths can be coupled to one another via the interface arrangement 56, even in the event that these system components 58, 60 rotate relative to one another. A first transmission path is formed from the light waveguides 80, 81, a second is formed from the light waveguides 86, 87, and a third is formed from the light waveguides 164, 165.

A prism 166 having a trapezoidal cross section is used for the coupling in this case.

The prism 166 may be coupled to the first system component 58 by means of one gear and to the second system component 60 by means of a further gear. Provision is then generally made that, when the first system component 58 rotates relative to the second system component 60 by an angle α, the prism is respectively rotated by an angle of 0.5α relative to both the first system component and the second system component, 58, 60. This is carried out automatically by using the gear and the further gear. In this way, it is possible to couple all the optical transmission paths to one another. The sequence, however, is then interchanged as can be seen in FIG. 10.

FIGS. 11a to 11c represent various embodiments of possible optical interfaces 76, 76' and 76". The embodiments represented may be used both for the optical interface 76 in the central region 66 and for one of the further optical interfaces 76' in the outer region 68.

FIG. 11a represents a further embodiment of an optical interface 76, 76', which operates with two light waveguides 80, 86. In the case of a relatively small gap dimension between the first system component 58 and the second system component 60, such transmission between two light waveguides may already be sufficient.

FIG. 11b shows a further embodiment. In this case, the second system component 60 comprises an optical coupling member 84, which is formed as a graded index lens (GRIN). With this, the rays emerging from the light waveguides 86 can be collimated in the light waveguides 80. In this way, transmission losses from the second system component 60 to the first system component 58 can be minimized.

FIG. 11c shows a further embodiment. In this case, the second system component 60 comprises an optical coupling member 84, which is formed as an optical lens. With this, rays emerging from the light waveguide 86 can be collimated in the light waveguide 80. In this way, transmission losses from the second system component 60 to the first system component 58 can be minimized.

The arrangements described above in FIGS. 11a to 11c for the first system component 58 and the second system component 60 may, of course, also be provided in a reverse arrangement. That is to say, the elements represented in the first system component 58 in the representations may also be arranged in the second system component 60, and vice versa, so that a mirror-symmetrical structure is obtained. Furthermore, the described optical coupling members may, of course, also be arranged both in the first system component 58 and in the second system component 60.

In principle, all types of optical elements are possible as optical coupling members 82, 84. The optical coupling members 82, 84 may be configured as lenses, typically as converging lenses. In this case, biconvex configurations as well as planoconvex configurations, but also concavo-convex surface configurations are possible for forming a converging lens. A similar light-converging effect may of course also be produced by means of a diffracting optical element (DOE), for example by means of a hologram or a computer-generated hologram (CGH). Of course, a desired optical effect may also be produced with a so-called graded index lens (GRIN). The refractive index profile over the diameter may in this case have a shape with steps, but also a continuous shape.

Furthermore, in the case of light waveguides 80, 86, it may be advantageous to orientate the fiber ends obliquely with respect to an optical transmission axis. Embodiments of this are represented in FIGS. 12a and 12b.

Figure 12A:
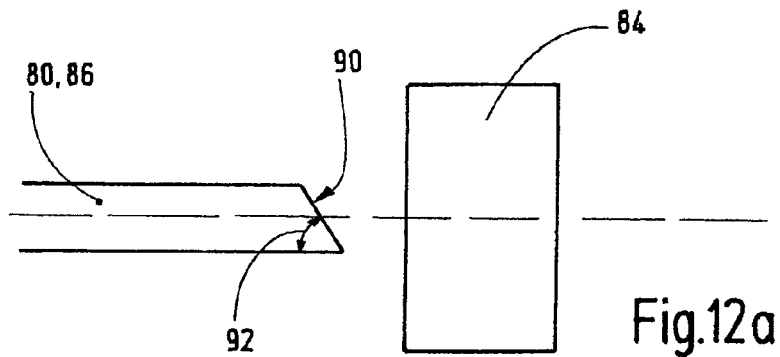
FIGS. 12a and 12b show possible embodiments of the coupling of a light waveguide with an optical coupling member.

In FIG. 12a, an optical transmission axis is denoted by the reference 88. Correspondingly, provision may be made to orientate an exit surface or end surface of a light waveguide 80, 86 at an angle 92 with respect to the optical transmission axis 88. In this way, it is generally possible to avoid interference due to reflections.

Figure 12B:
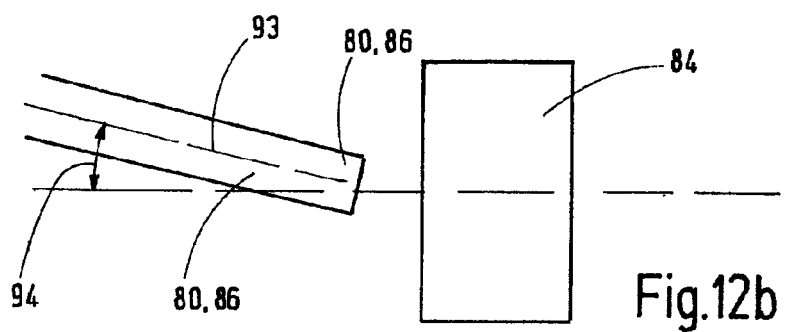

An alternative embodiment is represented in FIG. 12b. In this, a longitudinal axis 93, inclusive of the light waveguide 80, 86, is orientated at an angle 94 with respect to the optical transmission axis 88. Furthermore, it is naturally also conceivable both to orientate the end surface 90 obliquely and to also orientate the longitudinal axis 93 obliquely with respect to the transmission axis 88. Then, however, as a result, the end surface 90 should of course not be orientated perpendicularly with respect to the transmission axis.

For the angles 92, 94, a few degrees are generally selected, for example from 1° to 5° or from 3° to 6°.

FIGS. 13a to 13d represent various embodiments for the provision of an electrical interface or interface device 74.

Figures 13A, 13B, 13C:
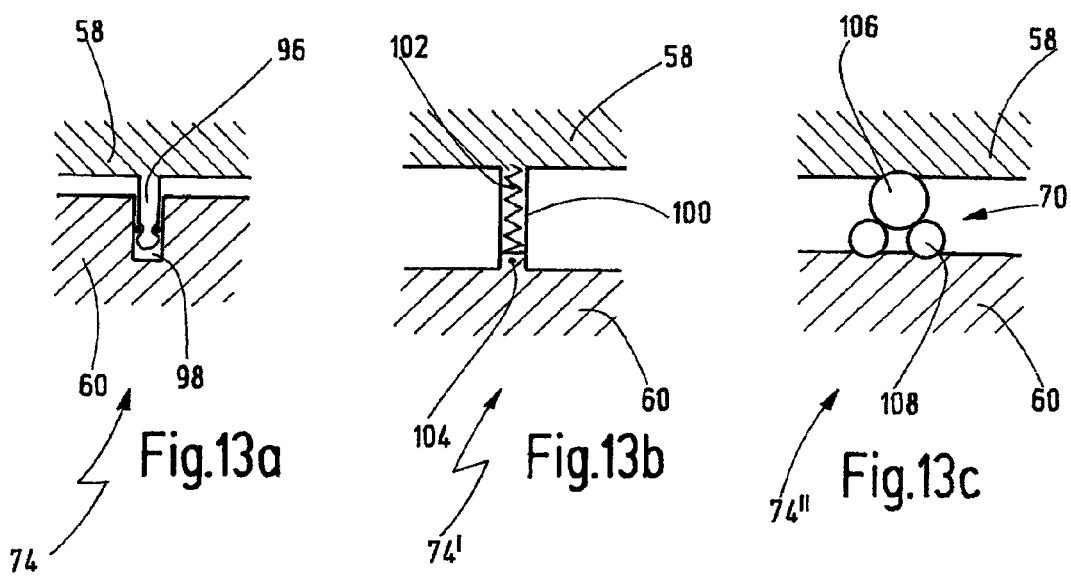
FIGS. 13a to 13d show possible embodiments of an electrical interface device, or an electrical interface.

FIG. 13a represents a jack/socket connection. The connection between the first system component 58 and the second system component 60 is in this case provided by means of a jack 96 and a socket 98. In the embodiment represented, the jack 96 is arranged in the first system component 58 and the socket 98 is arranged in the second system component 60. Of course, this may be the other way round. In general, provision is furthermore made for either the jack 96 or the socket 98 to be floatingly mounted, in order to facilitate automatic finding of the jack 96 and the socket 98 and to avoid stresses in the jack/socket connection.

In FIG. 13b, the first system component 58 comprises a contact pin 100 prestressed by means of a spring 102. It is pressed by means of the spring prestress onto a bearing surface 104 of the second system component 60. An electrical interface 74 may likewise be provided in this way.

Lastly, it is represented in FIG. 13c that a first bearing part 106 and a second bearing part 108 may also be provided in the three-point bearing 70 of an electrical interface between the first system component 58 and the second system component 60.

The security of the contacts or of the electrical transmission path between the first system component 58 and the second system component 60 decreases from the embodiment represented in FIG. 13a to the embodiment represented in FIG. 13c. On the other hand, in the embodiment represented in FIG. 13c there is no mechanical impact on the relative positioning of the first system component 58 with respect to the second system component 60, since only the three-point bearing 70 present in any case is used. Depending on the application, therefore, one of the embodiments represented in FIG. 13a to FIG. 13c may be advantageous.

Figure 13D:
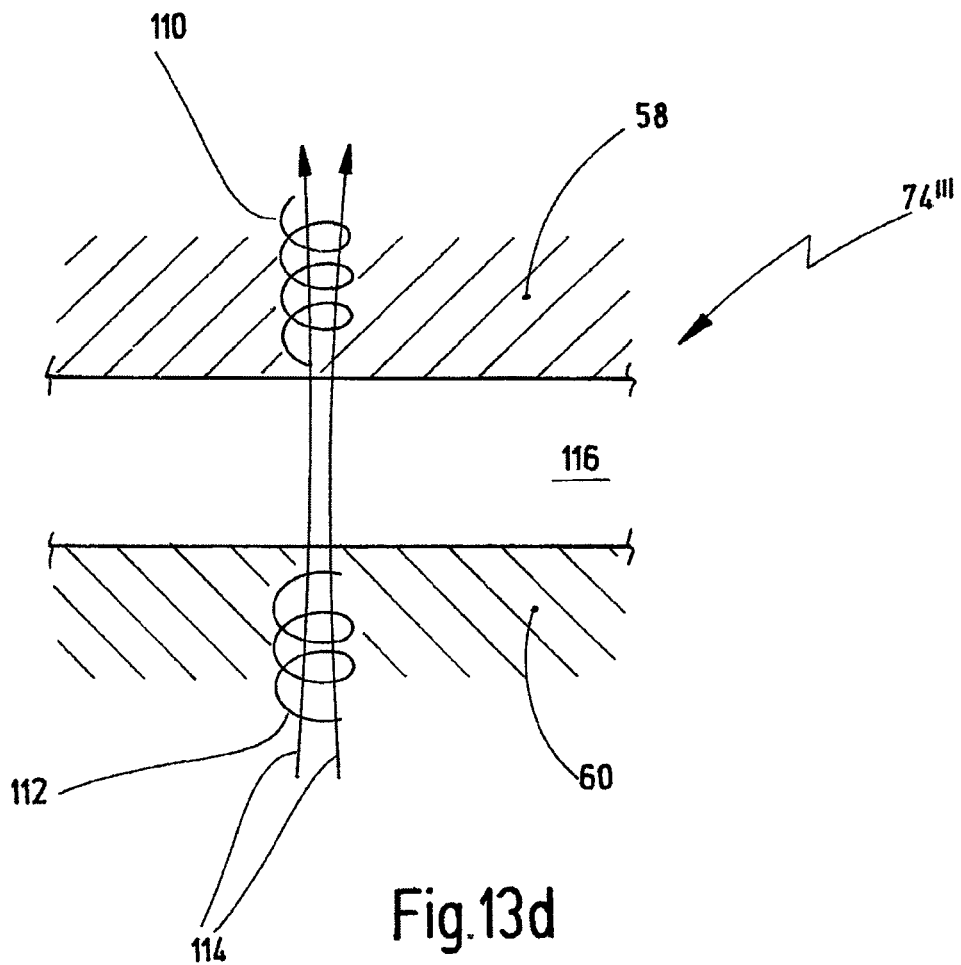

Lastly, FIG. 13d represents a further embodiment of an electrical interface 74. In this, an electrical interface 74 between the first system component 58 and the second system component 60 is provided contactlessly via a gap 116 located between them. In particular, to this end the principle of mutual induction, or the use of inductive resonant transmitters, is suitable. This may be used both for electrical energy transmission and for transmission of electrical signals. The structure is represented merely schematically in FIG. 13d. In general, to this end a coil 110, 112 is respectively arranged both in the first system component 58 and in the second system component 60. By energizing one of the coils, for example the coil 110, a magnetic field is generated which is schematically indicated by field lines 114 in a sketch. The field lines also extend through the other respective coil, for example the coil 112, and by the principle of induction a current then flows in turn in the coil 112. Owing to the small dimension of the gap 116, an electrical interface 74 can also in this way be provided contactlessly between the first system component 58 and the second system component 60.

A combination of such contactless transmission for electrical energy and use of optical interfaces for transmitting data or data signals between the first system component 58 and the second system component 60 is regarded as particularly advantageous in this case. In particular, such a variant has the advantage that the signals are galvanically decoupled.

For all proposed systems for transmitting electrical energy, it may furthermore be envisioned that they operate together with systems which are known by the term energy harvesting. These systems can convert and make usable even very small amounts of energy. Some examples are the use of electromagnetic radiation, for example by means of passive RFIDs, or photovoltaics.

What is claimed is:

1. A method for coupling a first system component and a second system component of a measuring device for determining by means of at least one sensor a property of an object to be measured, the method comprising the steps of:

providing an interface arrangement between the first system component and the second system component, wherein the interface arrangement is provided with at least one electrical interface, formed from at least two electric transmission paths, for transmitting a first electrical voltage between the first system component and the second system component, and with at least one optical interface formed at least from light waveguides;

supplying the at least one sensor with the first electrical voltage by means of at least two electrical transmission paths of the electrical interface;

transmitting, by means of the light waveguides of the at least one optical interface, a measurement signal acquired by means of the sensor; and providing an electrical identification transmission path for transmitting an identification signal for identifying a system component between the first system component and the second system component.

2. A method for coupling a first system component and a second system component of a measuring device for determining by means of at least one sensor a property of an object to be measured, wherein an interface arrangement is provided between the first system component and the second system component, wherein the interface arrangement is provided with a first electrical interface, formed from at least two electric transmission paths, for transmitting a first electrical voltage between the first system component and the second system component, and with at least one optical interface formed at least from light waveguides, wherein at least the at least one sensor is supplied with the first electrical voltage by means of at least two electrical transmission paths of the first electrical interface, wherein a measurement signal acquired by means of the sensor is transmitted by means of the light waveguides of the at least one optical interface and further wherein the interface arrangement is provided with a second electrical interface having at least two further electrical transmission paths for transmitting a second electrical voltage between the first system component and the second system component, and wherein the second system component includes at least one logic circuit that is supplied with the second electrical voltage.

3. The method as claimed in claim 2, wherein the measurement signal is an analog measurement signal and the analog measurement signal is converted into a digital measurement data signal, and wherein the digital measurement data signal is transmitted by means of the light waveguides of the at least one optical interface.

4. The method as claimed in claim 2, wherein three electrical transmission paths are provided for transmitting the first electrical voltage between the first system component and the second system component, and wherein the first electrical voltage is transmitted as a symmetrical voltage.

5. The method as claimed in claim 2, wherein the second electrical voltage is converted by means of a DC converter into an operating voltage of the at least one logic circuit.

6. The method as claimed in claim 2, wherein further power loads are supplied with the first electrical voltage.

7. The method as claimed in claim 2, wherein three further electrical transmission paths are provided for transmitting the second electrical voltage between the first system component and the second system component, and wherein the second electrical voltage is transmitted as a symmetrical voltage.

8. The method as claimed in claim 2, wherein an electrical synchronization line is provided for transmitting a synchronization signal between the first system component and the second system component.

9. The method as claimed in claim 2, wherein at least one electrical identification transmission path is provided for transmitting an identification signal for identifying a system component between the first system component and the second system component.

10. The method as claimed in claim 2, wherein a plurality of signals are transmitted in parallel by means of the light waveguides of the at least one optical interface.

11. The method as claimed in claim 10, wherein a synchronization signal is transmitted between the first system component and the second system component by means of the light waveguides of the at least one optical interface.

12. The method as claimed in claim 10, wherein an identification signal for identifying a system component is transmitted between the first system component and the second system component by means of the light waveguides of the at least one optical interface.

13. The method as claimed in claim 2, wherein more than one optical interface is provided.

14. The method as claimed in claim 13, wherein a synchronization signal is transmitted between the first system component and the second system component by means of the light waveguides of the at least one optical interface.

15. The method as claimed in claim 13, wherein an identification signal for identifying a system component is transmitted between the first system component and the second system component by means of the light waveguides of the at least one optical interface.

16. The method as claimed in claim 13, wherein a first optical interface and a second optical interface are provided, the digital measurement signal being transmitted unidirectionally by means of the first optical interface, and a bidirectional communication for communicating with at least one logic circuit and/or controlling device of the sensor and/or a drive device of the measuring device is provided by means of the second optical interface.

17. A measuring device for determining by means of at least one sensor a property of an object to be measured, having a first system component and a second system component, wherein an interface arrangement is formed between the first system component and the second system component, wherein the interface arrangement comprises at least one electrical interface, formed from at least two electrical transmission paths, for transmitting electrical energy between the first system component and the second system component, and at least one optical interface formed at least from light waveguides, wherein the at least one sensor is connected to the at least two electrical transmission paths in order to be supplied with electrical energy, and wherein the measuring device is furthermore configured in such a way that transmission of the measurement signal acquired by means of the sensor takes place via the at least one optical interface, and wherein at least one electrical identification transmission path is provided for transmitting an identification signal for identifying a system component between the first system component and the second system component.

18. A measuring device for determining by means of at least one sensor a property of an object to be measured, having a first system component and a second system component that is rotatably coupled about a rotational axis to said first system component, wherein an interface arrangement is formed between the first system component and the second system component, wherein the interface arrangement comprises at least one electrical interface, formed from at least two electrical transmission paths, for transmitting electrical energy between the first system component and the second system component, and at least one optical interface formed at least from light waveguides arranged coaxially with respect to said rotational axis, wherein the at least one sensor is connected to the at least two electrical transmission paths in order to be supplied with electrical energy, and wherein the measuring device is furthermore configured in such a way that transmission of the measurement signal acquired by means of the sensor takes place via the at least one optical interface.

19. The measuring device as claimed in claim 18, wherein the measuring device furthermore comprises an analog-digital-converter for converting an analog measurement signal acquired by means of the sensor into a digital measurement data signal, which is connected to the optical interface in such a way that transmission of the digital measurement data signal takes place via the at least one optical interface.

20. A method for coupling a first system component and a second system component of a measuring device for determining by means of at least one sensor a property of an object to be measured, wherein an interface arrangement is provided between the first system component and the second system component, wherein the interface arrangement is provided with at least one electrical interface, formed from at least two electric transmission paths, for transmitting a first electrical voltage between the first system component and the second system component, and with at least one optical interface formed at least from light waveguides, wherein at least the at least one sensor is supplied with the first electrical voltage by means of at least two electrical transmission paths of the electrical interface, wherein a digital measurement signal acquired by means of the sensor is transmitted by means of the light waveguides of the at least one optical interface, and further wherein a first optical interface and a second optical interface are provided, the digital measurement signal being transmitted unidirectionally by means of the first optical interface, and a bidirectional communication for communicating with at least one logic circuit and/or controlling device of the sensor and/or a drive device of the measuring device is provided by means of the second optical interface.

* * * * *